Aug. 28, 1923.   1,466,610
R. A. WEINHARDT
BRACKET SUSPENSION OR MOTOR SUPPORTING MEANS
Filed May 21, 1917
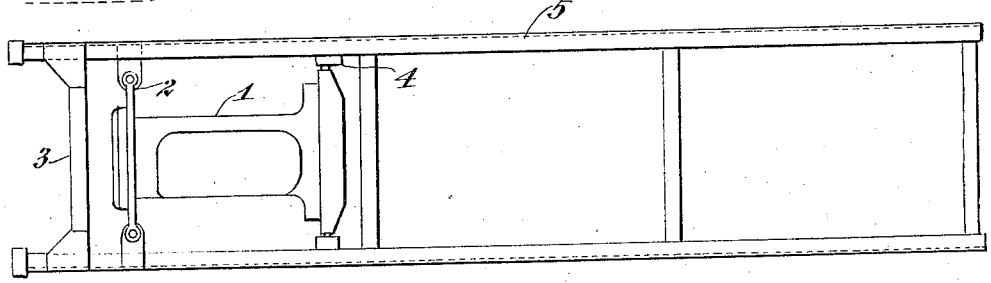
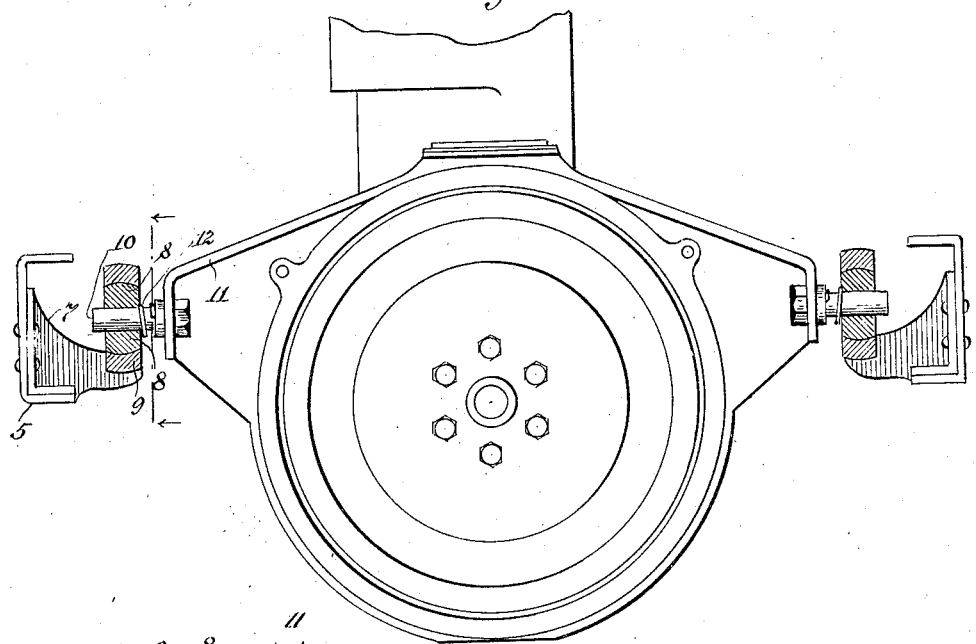
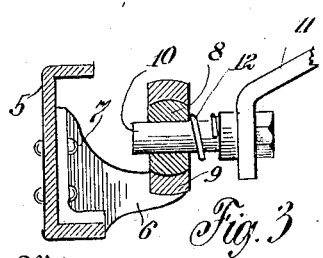
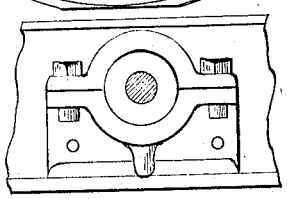
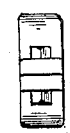
Inventor
Robert A. Weinhardt
Attorneys Patented Aug. 28, 1923.

1,466,610

UNITED STATES PATENT OFFICE.

ROBERT A. WEINHARDT, OF CHICAGO, ILLINOIS, ASSIGNOR TO CONTINENTAL MOTORS CORPORATION, OF DETROIT, MICHIGAN, A CORPORATION OF VIRGINIA.

BRACKET-SUSPENSION OR MOTOR-SUPPORTING MEANS.

Application filed May 21, 1917. Serial No. 169,852.

*To all whom it may concern:*

Be it known that I, ROBERT A. WEINHARDT, a citizen of the United States of America, residing at Chicago, in the county of Cook and State of Illinois, have invented certain new and useful Improvements in Bracket-Suspension or Motor-Supporting Means, of which the following is a specification, reference being had therein to the accompanying drawings.

In the operation of motor vehicles, the weaving of the chassis frame, which is unavoidable under certain circumstances brings considerable strain upon the parts which support the power plant or engine, particularly that portion which is toward the middle of the chassis, since the comparatively rigid end portions, if they warp in opposite directions tend to bring the middle portions of the longitudinal side members more closely together than when the frame is not distorted.

This invention relates to a bracket or brackets for supporting a power plant or engine on the chassis of a motor vehicle and to a disposition and arrangement of parts that permit limited movement to and from each other, of the outer longitudinal chassis members between which the engine is usually hung.

The invention consists in the matters hereinafter set forth, and more particularly pointed out in the appended claim.

In the drawings,

Figure 1 is a view, largely diagrammatic, showing the general disposition of a power plant on a chassis together with supporting members that embody features of the invention;

Fig. 2 is a view in end elevation, enlarged, of the power plant and supporting members, and Figs. 3, 4 and 5 are views in detail of the bracket itself.

Referring to the drawings a power plant 1 of conventional type is supported in any suitable manner as by members indicated at 2, near the forward end of a chassis 3, while at the other end portion of the power plant, brackets 4 secured to the longitudinal side members 5 of the chassis carry the inner end portion of the frame.

Each bracket consists of a hanger 6 adapted to be secured as by rivets or bolts 7 to the channel bar 5 that is the usual mill-form used for the side members. A bearing ball 8 is journaled in the split yoke portion 9 formed on the member 6, the design of the bracket and yoke being such as to combine strength with lightness.

A stud 10 that is longitudinally reciprocable and rotatable in the ball 8 is secured to the bracket 11 of the power plant, the dimensions of the parts being disposed and arranged to meet the conditions of the particular design for which the bracket is used.

There is sufficient play between the ball 8 and the head of the stud to permit the shifting of the side members 5 toward and away from each other under any weaving of the chassis.

If desired, a spring 12 may be interposed between the stud head and the ball to provide a cushioning effect although this is not necessary.

As a result of this method of support, there is no strain whatever imposed upon the power plant bearing arms or lugs from any weaving of the chassis as the brackets can come and go freely while any angular relation assumed by the sides is compensated for in the ball sockets. This obviates and minimizes breakage from these causes.

Obviously changes in the details of construction may be made without departing from the spirit of my invention and I do not care to limit myself to any particular form or arrangement of parts.

What I claim is:—

In the mounting of power plants for motor vehicles, and wherein the power plant is supported by and between longitudinal members of the chassis, means connecting the forward portion of the plant with such members, and means for supporting the rear portion of the plant from said members, said supporting means including a ball-like element carried by each longitudinal member with each element having a diametrically extending opening, and a bearing stud for each of said elements, said studs being carried by the plant and projecting from opposite sides thereof into said openings, the relative positions of the studs and elements being such as to permit relative movement between the plant and the members in a direction lateral to the direction of length of such members, said latter means including cushioning means carried by the studs, and interposed between the ball-like elements and the plant to yieldingly maintain the plant in normal position.

In testimony whereof I affix my signature in the presence of two witnesses.

ROBT. A. WEINHARDT.

Witnesses:
R. W. SLOANE,
J. P. THILL.